United States Patent [19]

Eibensteiner

[11] 4,369,473
[45] Jan. 18, 1983

[54] RECORDING AND/OR REPRODUCING APPARATUS

[75] Inventor: Walter Eibensteiner, Vienna, Austria

[73] Assignee: U.S. Philips Corporation, New York, N.Y.

[21] Appl. No.: 166,425

[22] Filed: Jul. 7, 1980

[30] Foreign Application Priority Data

Jul. 20, 1979 [AT] Austria .................. 5028/79

[51] Int. Cl.³ .................. G11B 5/08; G11B 15/12
[52] U.S. Cl. .................. 360/85; 360/63; 360/84
[58] Field of Search .................. 360/83, 84, 85, 63, 360/64, 78; 242/194, 197

[56] References Cited

U.S. PATENT DOCUMENTS

| | | | |
|---|---|---|---|
| 2,915,595 | 12/1959 | Lyon | 360/84 |
| 2,952,746 | 9/1960 | Sampson | 360/63 |
| 3,668,310 | 6/1972 | Yano | 360/84 |
| 3,932,894 | 1/1976 | Arter | 360/84 |
| 4,139,873 | 2/1979 | Maxey | 360/85 |
| 4,274,118 | 6/1981 | Mangold | 360/84 |
| 4,302,787 | 11/1981 | Itani | 360/85 |

FOREIGN PATENT DOCUMENTS

1337993 11/1973 United Kingdom .
1124759 10/1975 United Kingdom .

Primary Examiner—Robert M. Kilgore
Attorney, Agent, or Firm—David R. Treacy

[57] ABSTRACT

Figure 1:
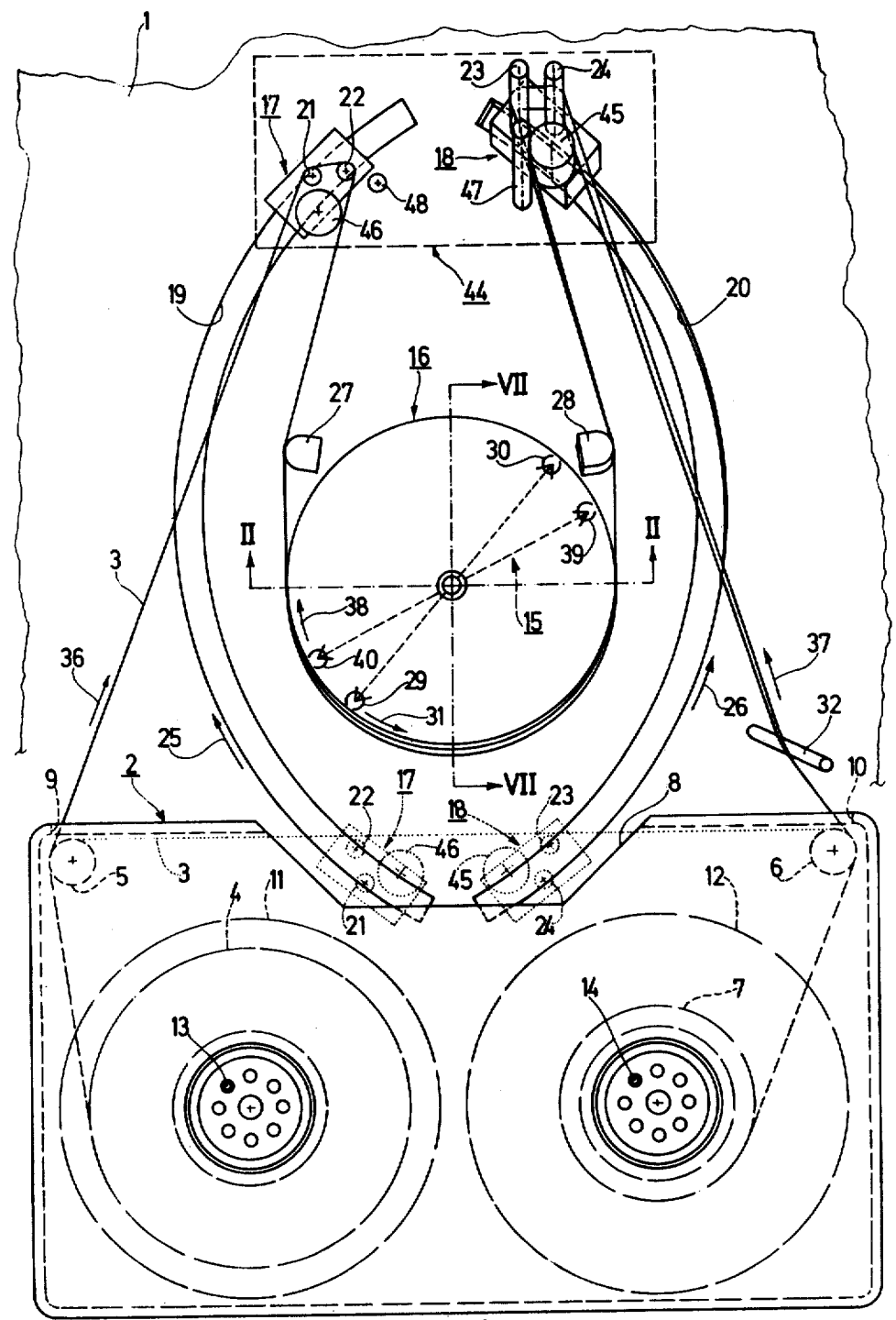

In a recording and/or reproducing apparatus comprising at least one magnetic head (29, 30), which is rotatable in a given direction of rotation (31), and at least one tape guide (16) for a magnetic tape (3), which guide is arranged near said head, said tape passes round at least a part of the circumferential surface of the tape guide and past the magnetic head, which rotates at a given level oblique tracks being scanned by means of said magnetic head in a given direction of movement (36) of the magnetic tape, which tracks are each time situated within a longitudinal half of the magnetic tape. In this apparatus means are provided whereby the magnetic tape can also be driven in a direction of movement (37) opposite to the given direction of movement, and by means of a magnetic head (39, 40) which rotates in a direction of rotation (38) opposite to the given direction of rotation and at a further level which is spaced from the given level by a distance substantially equal to half the width of the magnetic tape, tracks are scanned which are situated within the second longitudinal half of the magnetic tape (FIG. 1).

18 Claims, 16 Drawing Figures

RECORDING AND/OR REPRODUCING APPARATUS

The invention relates to a recording and/or reproducing apparatus, comprising at least one magnetic head which is rotatable in a given direction of rotation and at least one drum-shaped tape guide for a magnetic tape, which tape guide is arranged near said magnetic head, and which magnetic tape can pass round at least a part of the circumferential surface of the tape guide and past the magnetic head which rotates at a given level, the magnetic head scanning oblique tracks which are situated within one longitudinal half of the magnetic tape, and comprising a drive arrangement for the transport of the magnetic tape in a given direction of movement with a given speed in order to scan the tracks. Such apparatus is known from DE-OS No. 14 99 627. In this known apparatus the other longitudinal half of the magnetic tape can be used by reversing said tape, as in known tape recorders with half-track operation. After reversal of the magnetic tape the tape transport is effected in the same direction of movement as before, whilst the direction of rotation of the rotatable magnetic head is also the same as before. However, such a reversal of the magnetic tape is generally regarded as a drawback, because it demands a certain time during which no recording or reproduction is possible.

It is an object of the invention to eliminate the said drawback and to this end an apparatus of the type mentioned in the preamble is characterized in that by means of the drive arrangement the magnetic tape can also be driven selectively in a direction of movement opposite to the given direction of movement and at the given speed in order to scan the tracks, and in that during transport of the tape in said opposite direction of movement at least one magnetic head which relates at a further level which is spaced from the given level by a distance which is substantially equal to half the width of the magnetic tape and which has a direction of rotation opposite to the given direction of rotation, scans oblique tracks which are situated within the second longitudinal half of the magnetic tape. In this way continuous operation of the apparatus is possible, whilst at the change-over from scanning the tracks in one longitudinal half of the tape to those in the other longitudinal half merely the direction of movement of the magnetic tape has to be reversed and a magnetic head which scans the tracks within the relevant longitudinal half has to be put into operation. In order to carry out the last-mentioned operation, any one of embodiments could be used as will be described in detail hereinafter; for example there may be provided axially spaced magnetic heads which continuously rotate in opposite direction of rotation, or the direction of rotation of a magnetic-head arrangement comprising axially spaced magnetic heads may be reversed etc. The change-over of the said apparatus functions may be controlled automatically by the apparatus, for example when the end of the magnetic tape is reached, but may also be effected by the user of the apparatus by actuation of a corresponding control.

In this respect it is to be noted that the selective scanning of a magnetic tape in opposite directions of movement for recording or playback is of course known per se from audio-tape equipment. However, in such audio-tape equipment only tracks in the longitudinal direction of the magnetic tape are scanned continuously either with an adjustable magnetic head or with one of a plurality of magnetic heads. In the apparatus in accordance with the invention, however, tracks which extend obliquely of the magnetic tape are successively scanned by a rotatable magnetic head, resulting in a basically more intricate track configuration, for which the exact path of the magnetic tape and the movement of the magnetic head relative to the magnetic tape are essential.

As in an apparatus of the type mentioned in the preamble the magnetic tape has to pass round the circumferential surface of a tape guide near the rotatable magnetic head and particularly stringent requirements are imposed on the accuracy of the path of the magnetic tape. Special attention is to be paid to the drive of the magnetic tape. In an apparatus in accordance with the invention it should be possible to pass the magnetic tape accurately round such a tape guide in mutually opposite directions of movement, so that its drive becomes particularly important, for which reason it is found to be advantageous in this respect if the drive arrangement comprises two drive shafts which each cooperate with a pressure roller and which are rotatable in opposite directions of rotation and of which one drive shaft is located upstream of the tape guide with respect to the given direction of movement of the magnetic tape and the other is located upstream of the tape guide with respect to the opposite direction of movement of the magnetic tape, only that drive shaft being operative which is located upstream of the tape guide when the tape is in motion. This ensures that the magnetic tape passes correctly round the tape guide and past the rotatable magnetic head in each of its directions of movement. It is to be noted that the provision of two alternately operative drive shafts which are respectively arranged downstream and upstream of a magnetic head and which can be driven in opposite directions is also known per se from the afore-mentioned audio-tape equipment with reversible direction of movement of the magnetic tape, but in comparison with the apparatus in accordance with the invention there is again the basic difference in respect of the method of track scanning.

In an apparatus in accordance with the invention, as stated previously, scanning of the tracks situated within one longitudinal half of the magnetic tape may be effected with for example a magnetic head which is rotatable in one direction of rotation, and scanning of the tracks which are situated within the second longitudinal half of the magnetic tape may be effected with a further magnetic head which is rotatable in the oppposite direction of rotation, the magnetic heads rotating at levels which are spaced axially from each other by a distance which substantially equals half the width of the magnetic tape. In an apparatus in which there is provided as a magnetic-head support a drum which is rotatable in a given direction of rotation, and around at least a part of whose circumferential surface, the magnetic tape can pass substantially over its full width, and an edge of which constitutes a gap with an edge of the tape guide, the magnetic head(s) being operative at the given level near said drum edge during transport of the magnetic tape in the given direction of movement, it is found to be particularly advantageous if during transport of the tape in said opposite direction of movement the drum can also be driven in a direction of rotation opposite to the given direction of rotation, the magnetic head that scans the tracks situated within the second longitudinal half of the magnetic tape being operative on the drum at the further level which in the direction of the drum axis is spaced from said drum edge by a distance substantially equal to half the width of the magnetic tape. In this way a rotatable magnetic-head arrangement is formed, whose direction of rotation is selected in conformity with the obtaining direction of movement of the magnetic tape. Technologically such a step can be realized in a comparatively simple and reliable manner. The drum itself then constitutes a rotating guide for the magnetic tape.

In this respect it is found to be advantageous if the magnetic head which in the opposite direction of movement of the magnetic tape scans oblique tracks situated within the second longitudinal half of the magnetic tape extends through an opening in the drum, which opening opens out of the circumferential surface of said drum and extends radially of the drum and is situated at the further level. In this way the drum also constitutes a rotating guide for the magnetic tape near the magnetic head which scans the tracks situated within the second longitudinal half of the magnetic tape, so that an additional drum-shaped tape guide at this location may be dispensed with.

Furthermore, it is found to be advantageous if by means of an over-center adjusting device on the drum which device can be actuated by the apparatus, the magnetic head is movable between two over-center positions which in the direction of the drum axis are situated at distance from each other which is substantially equal to half the width of the magnetic tape, said head, when it is moved from one over-center position to the other, first being withdrawn from the circumferential surface of the drum towards the interior of the drum, then being moved axially of the drum and subsequently being returned towards the circumferential surface of the drum. In this way the tracks situated within each of the two longitudinal halves of the magnetic tape can alternately be scanned by means of the same magnetic head. The over-center positions ensure that the positions in which the magnetic head is operative are maintained exactly and without lost motion when the adjusting device no longer exerts a force. As the magnetic head moves in a substantially radial direction with respect to the circumferential surface of the drum, it is ensured that such a movement can be performed without damage to the magnetic head or the magnetic tape, even during transport of the magnetic tape and/or when the drum rotates.

However, it is found to be advantageous if on the drum there are provided two magnetic heads which are spaced from each other in the direction of the drum axis by a distance substantially equal to half the width of the magnetic tape, the two magnetic heads can be selectively activated electrically and/or mechanically for the active scanning of the track within one or the other of the two longitudinal halves of the magnetic tape, depending on the direction of movement of the magnetic tape and/or the direction of rotation of the drum. In this way a separate magnetic head is provided for each of the two longitudinal halves of the magnetic tape for scanning the tracks situated within said half, so that if the corresponding direction of rotation of the drum is selected the tracks within the desired longitudinal half of the magnetic tape can simply be scanned by activating one of the two magnetic heads.

In this respect it is furthermore found to be advantageous if by means of an over-center adjusting device, which can be actuated by the apparatus for the mechanical activation of a magnetic head, this head is shifted into an over-center position substantially in a radial direction relative to the circumferential surface of the drum and at the same time, for the mechanical deactivation of the other magnetic head, this head is withdrawn out of an over-center position substantially in a radial direction relative to the circumferential surface of the drum. This specifically yields the advantage that always only one of the two magnetic heads cooperates with the magnetic tape, so that in the case of an equally long operating time for each of the two magnetic heads their useful life is doubled. As the magnetic heads are moved substantially in a radial direction relative to the circumferential surface of the drum, it is again ensured that such a movement can be effected without damage to the magnetic heads or the magnetic tape, even during transport of the magnetic tape and/or when the drum rotates. Furthermore, the over-center position for an activated magnetic head again ensures that this position, in which the magnetic head is operative, is maintained correctly and without play when the adjusting device no longer exerts a force. A simple construction may then be obtained if the two magnetic heads are arranged on a toggle. For a simple construction it is also found to be advantageous if each of the two magnetic heads is arranged on a four-bar linkage and the two four-bar linkages are coupled to each other so as to be moved jointly but in opposite directions.

For an electrical activation of the selected magnetic head it is found to be advantageous if the two magnetic heads are mounted to be stationary in a radial direction relative to the circumferential surface of the drum and for the selective electrical activation of one or the other of the two magnetic heads there is provided on the drum a switching device, which, depending on its switching position, switches on one of the two magnetic heads and switches off the other head so as to deactivate the latter head. As the magnetic heads are mounted to be stationary in a radial direction relative to the circumferential surface of the drum, a particularly simple mechanical construction is obtained, and by the provision of the switching device on the drum it is ensured that the magnetic heads are switched on and off in a favourable manner, because this is effected directly at their electrical connections, so that spurious signals may be avoided. In this respect it is found to be advantageous if the switching device can be actuated via a sleeve which is coaxial with the drum axis and which is axially movable by the apparatus. Such an actuation of the switching device is simple and reliable. Suitably, however, the switching device can also be actuated automatically depending on the direction of the rotation of the drum, so that a mechanical adjusting device which acts between the rotating drum and the apparatus may be dispensed with. For the automatic actuation of the switching device it is effective to provide a rotary switch-actuating member which is mounted for free rotation about the drum axis and which can be driven by the drum depending on the direction of rotation thereof, and on which a braking force can be exerted by means of a brake on the apparatus. It is also found to be advantageous if for the automatic actuation of the switching device on the drum there is provided a pendulum-shaped lever which is pivotable in a plane perpendicular to the drum axis and about an eccentric axis which is parallel to the drum axis.

As is known, it is of particular importance in such equipment that a magnetic head scans each track in a particularly accurate manner and does not leave said track. For this purpose, as is known per se, a magnetic head may be connected to the drum via an electrically controllable positioning element, which positions the magnetic head in a direction extending transversely of the track to be scanned depending on a control signal which corresponds to a tracking error and which is applied to the positioning element, so that the head follows the relevant track. In an apparatus in accordance with the invention it is found to be advantageous if each of the two magnetic heads, for guiding it along the tracks, is connected to the drum via an associated electrically controllable positioning element and the two positioning elements are electrically connected in parallel. By such a parallel electrical connection of the two positioning elements the relevant control voltage can be simply applied to said elements, because for two positioning elements only two supply leads to the rotary drum are required.

In this respect it is also found to be advantageous if the two magnetic heads are arranged on a common support, which is connected to the drum via an electrically controllable positioning element for guiding the magnetic heads along the tracks. In this way only one positioning element is required for two magnetic heads.

Figure 2:
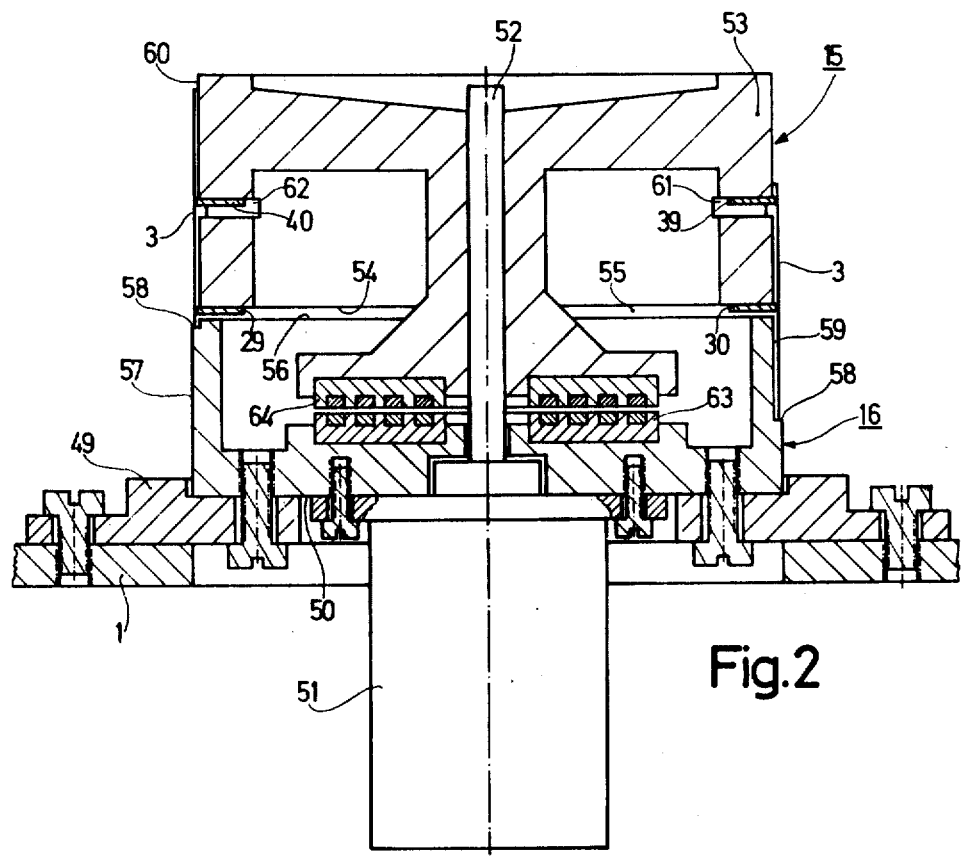
Figure 3:
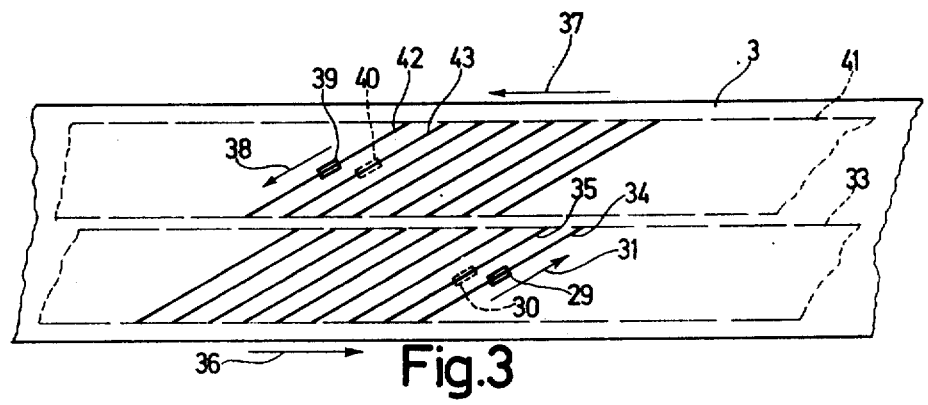
Figure 4:
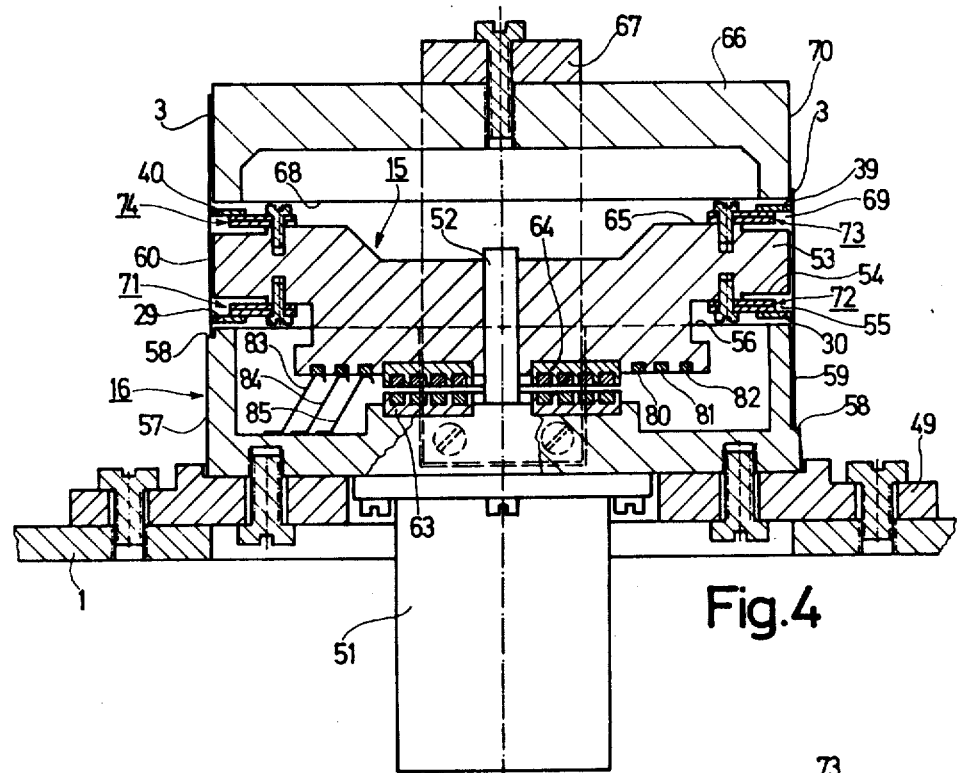
Figure 5:
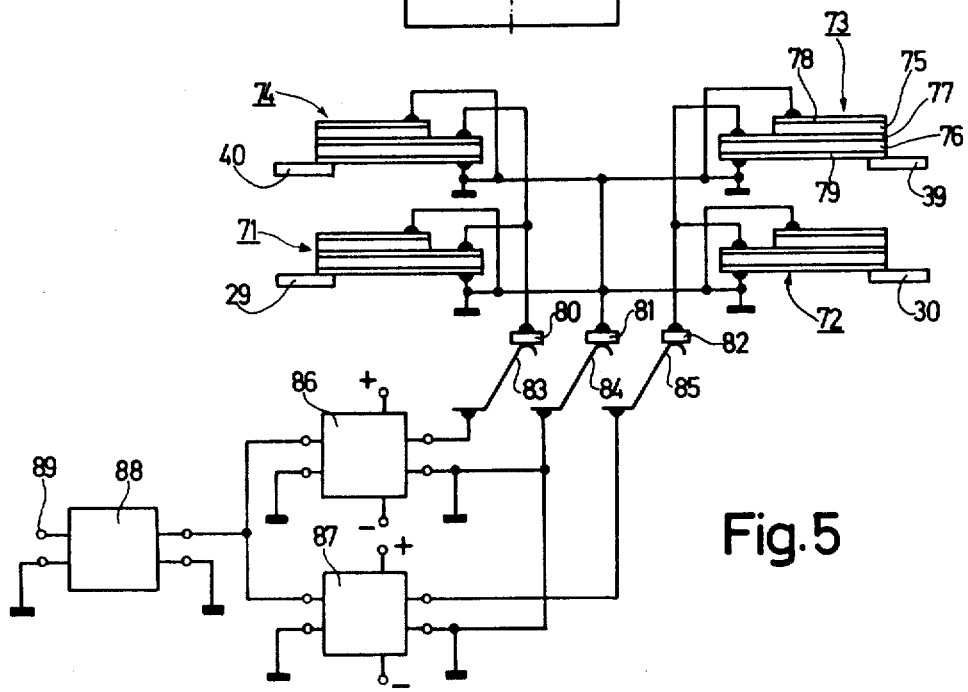
Figure 6:
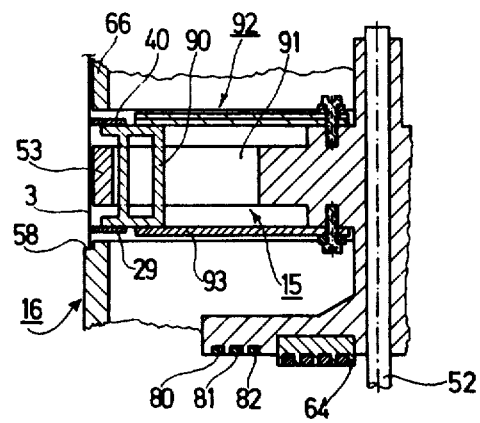
Figure 7:
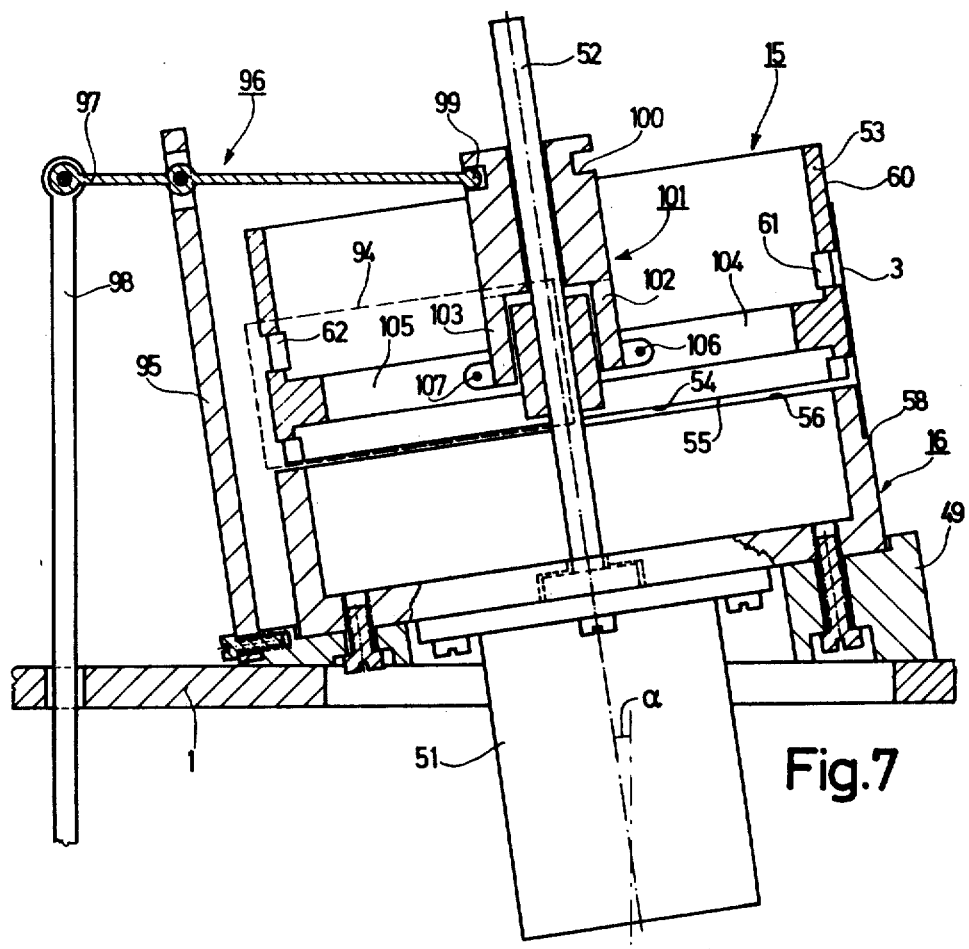
Figure 8:
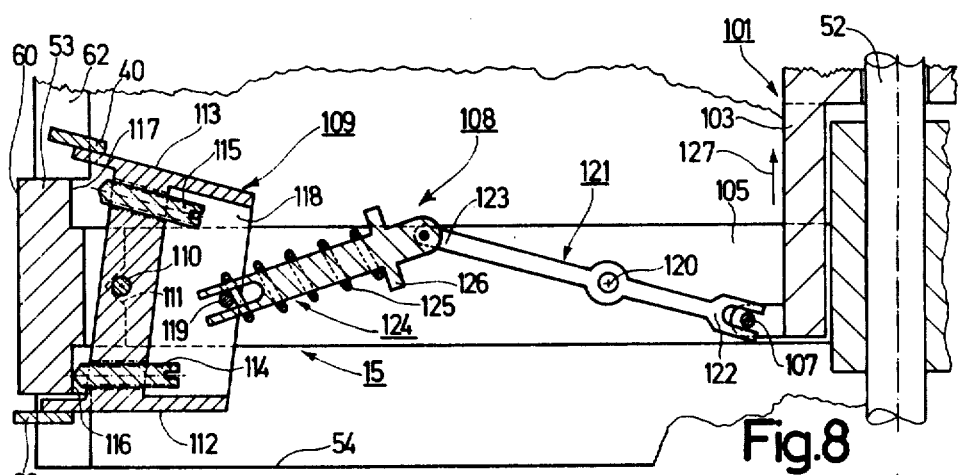
Figure 9:
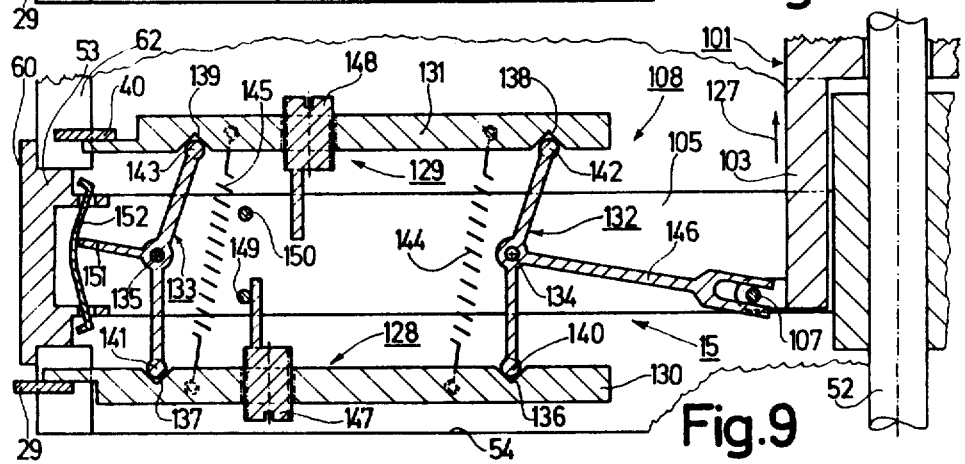
Figure 10:
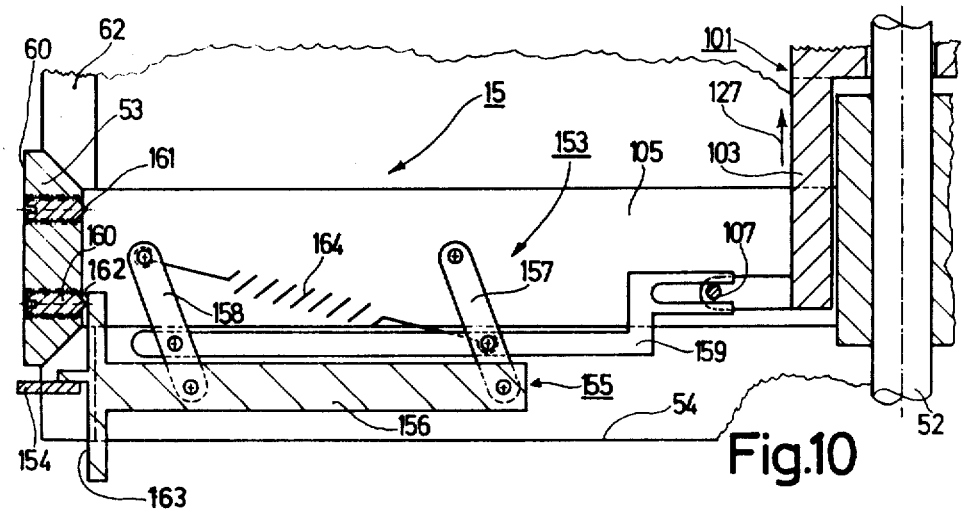
Figure 11:
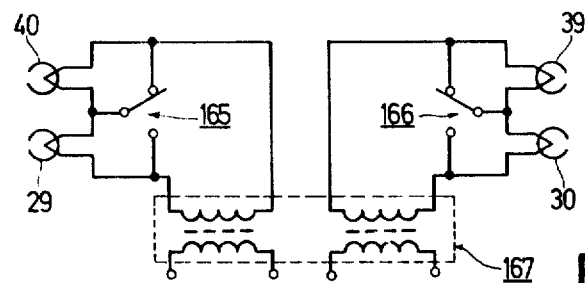
Figure 12:
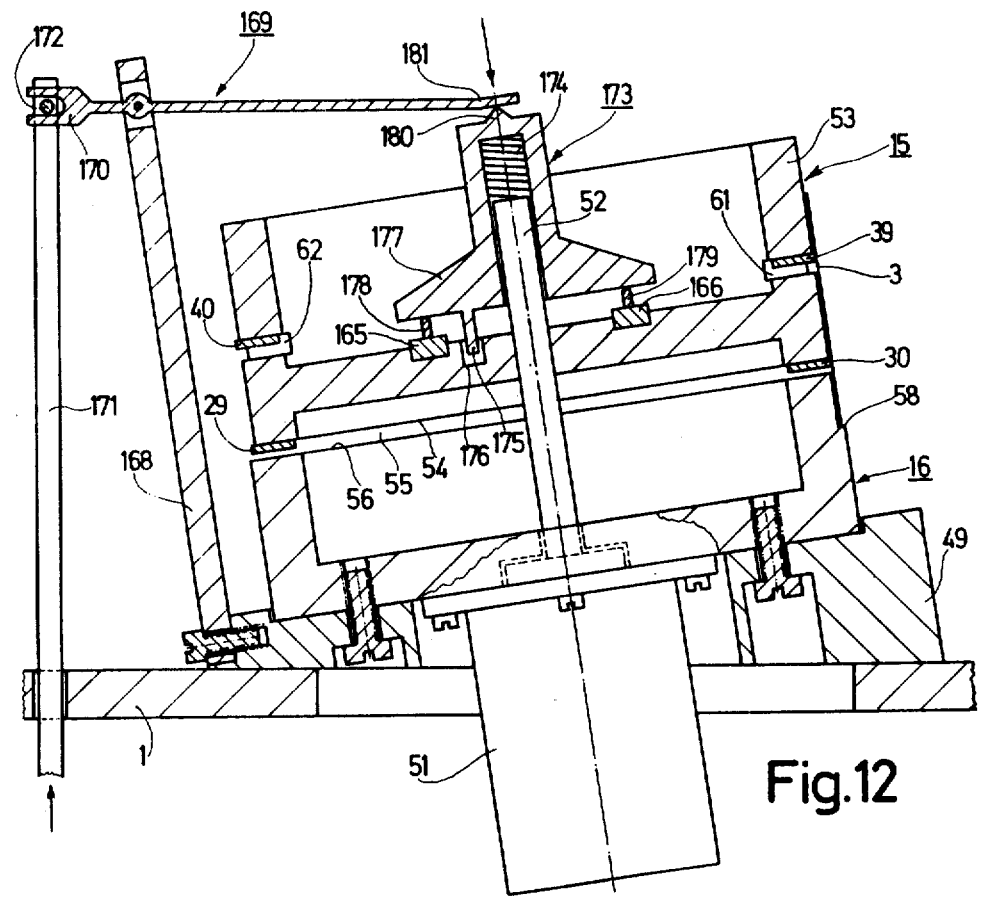
Figure 13:
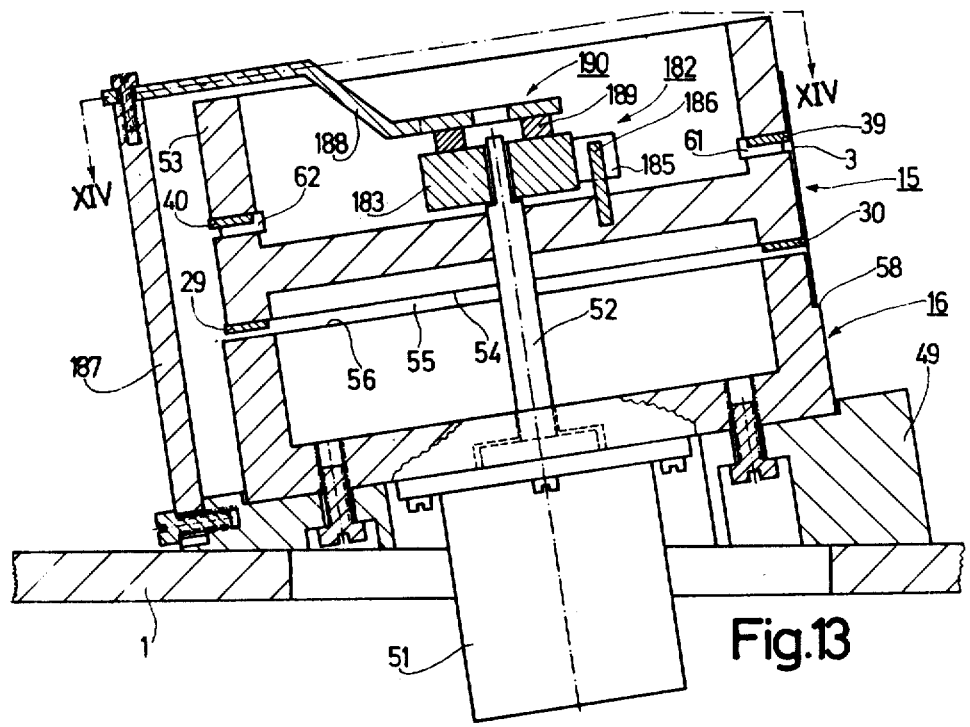
Figure 14:
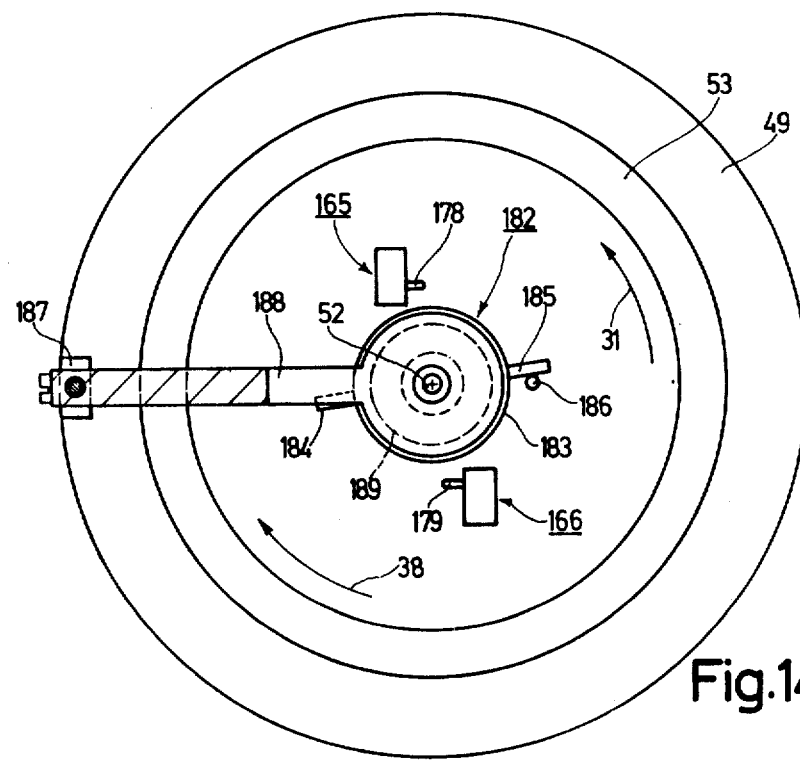
Figure 15:
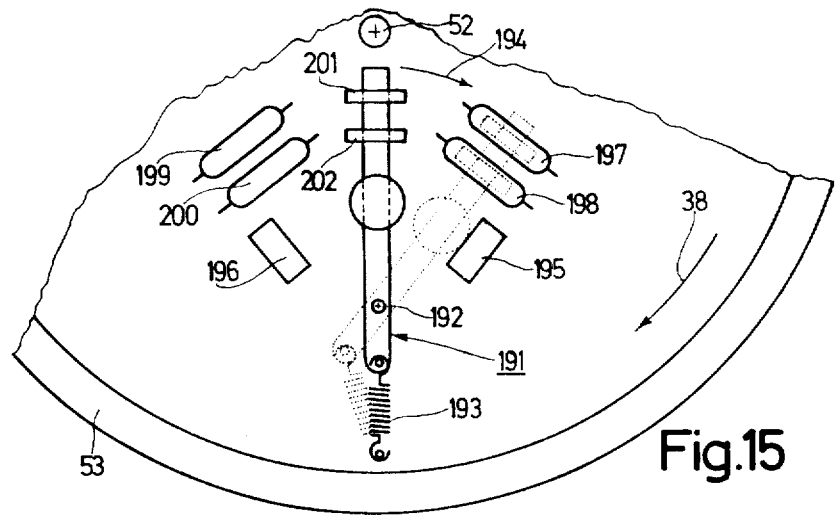
Figure 16:
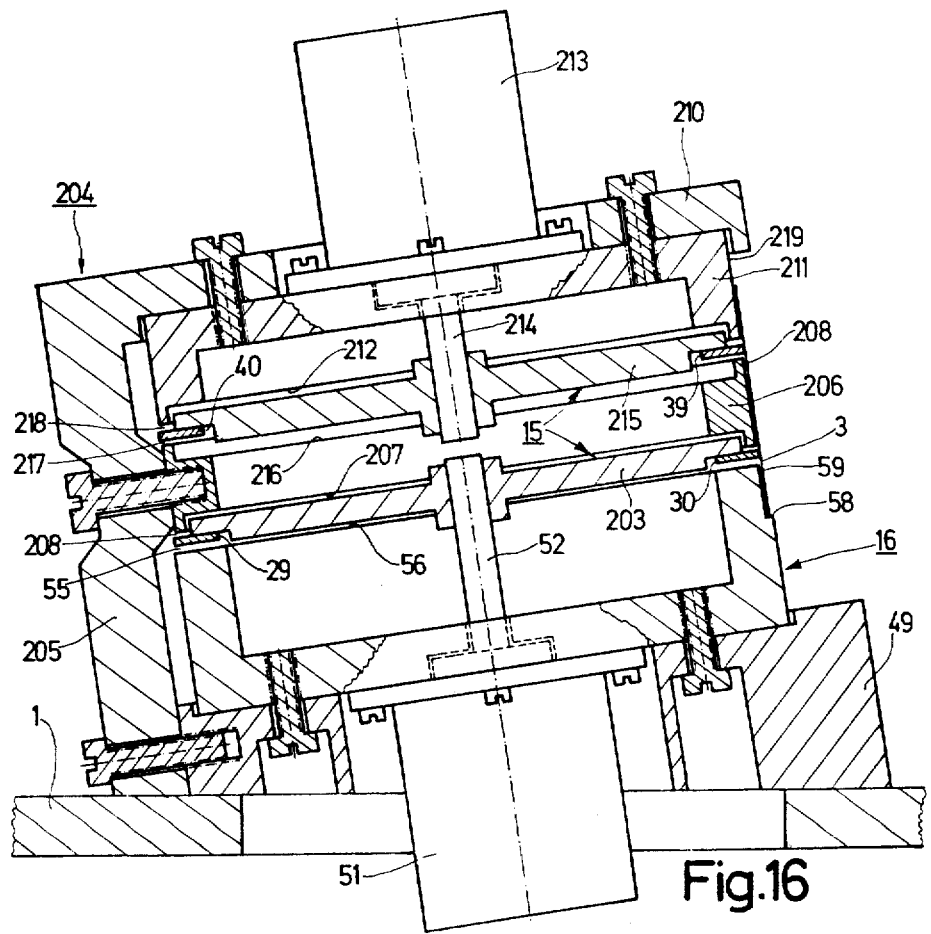

The invention will be described hereinafter with reference to the drawings, which partly in schematic form represent some embodiments of the invention to which the invention is not limited, and in which drawings FIG. 1 is a plan view of a recording and/or reproducing apparatus, showing the path of the magnetic tape from a supply reel to a take-up reel via a drum-shaped tape guide and a rotatable magnetic head arrangement which is coaxial with said tape guide, FIG. 2 is a detailed cross-section, taken on the line II—II in FIG. 1, of a drum-shaped tape guide and a rotatable drum which is coaxial with said tape guide and which carries the magnetic heads, FIG. 3 shows a track pattern on the magnetic tape, FIG. 4 in a similar manner to FIG. 2 shows a drum together with two drum-shaped tape guides, the magnetic heads being connected to the drum via electrically controllable positioning elements, FIG. 5 shows a circuit arrangement for electrically controlling the positioning elements of FIG. 4, FIG. 6 is a detailed view showing a device for the tracking of two magnetic heads with a single electrically controllable positioning element, FIG. 7 shows a drum-shaped tape guide and a drum in a cross-section taken on the line VII—VII of FIG. 1, as well as a device for transmitting a positioning movement from the apparatus to the drum, FIG. 8 shows in detail the part of the drum shown in FIG. 7 which is bounded by a broken line, two magnetic heads being arranged on a toggle for the purpose of moving them, FIG. 9 shows in detail the same part of the drum as shown in FIG. 8, but with two magnetic heads arranged on a four-bar linkage in order to position them, FIG. 10 shows in detail the same part of the drum as is shown in FIG. 8 but with a single magnetic head mounted on a four-bar linkage so as to enable it to be moved at two levels, FIG. 11 represents a circuit arrangement for the electrical activation or deactivation of magnetic heads on a drum, FIG. 12 in a similar manner to FIG. 7 shows a drum on which there is provided a switching device which can be actuated by the apparatus, FIG. 13, in a similar manner to FIG. 12 shows a drum on which is mounted a switching device which can be actuated automatically by means of a rotary switching member in accordance with the direction of rotation of the drum, FIG. 14 shows the arrangement of FIG. 13 in a view taken on the line XIV—XIV in FIG. 13, FIG. 15 shows the part of a drum on which is mounted a switching device which can be actuated automatically by means of a pendulum-shaped leverl, in accordance with the direction of rotation of the drum, and FIG. 16, in a similar manner to FIG. 7, shows two rotatable magnetic head arrangements with the associated drum-shaped tape guides.

In FIG. 1 the chassis of a recording and/or reproducing apparatus is designated 1, on which chassis a cassette 2 has been placed. This cassette accommodates a magnetic tape 3, which when the apparatus is in its starting position extends from a tape roll 4 via a guide roller 5 to a further guide roller 6 and to a second tape roll 7, as is indicated by the dotted lines. The cassette is formed with a recess 8 and, on opposite sides of this recess, with openings 9 and 10 past which the magnetic tape extends. The tape rolls 4 and 7 are accommodated on reels 11 and 12, which can respectively be driven in the usual manner by means of winding mandrils 13 and 14 on the apparatus.

For recording and/or reproducing signals, in particular television signals, on the magnetic tape, said tape is withdrawn from the cassette and wrapped helically around the circumferential surface of a rotatable magnetic-head arrangement 15, schematically represented in FIG. 1, as well as a drum-shaped tape guide 16 disposed near said arrangement, as is represented by the solid lines in FIG. 1. In order to bring the magnetic tape from the cassette to the magnetic-head arrangement 15 and the tape guide 16, there are provided two tape guide devices 17 and 18, which are movable along guideways 19 and 20. In the starting position of the apparatus the tape guide devices 17 and 18 are located near the recess 8 of the cassette 12, as is indicated by the dotted lines. Two guide pins 21, 22 and 23 24 respectively, mounted on the tape guide devices, then engage behind the magnetic tape in the recess 8 of the cassette. When the tape guide devices 17 and 18 are moved in the direction of the arrows 25 and 26 respectively into the operating position represented by the solid lines in FIG. 1, the guide pins 21, 22 and 23, 24 respectively engage the magnetic tape, said tape being pulled out of the cassette and being wrapped around the magnetic-head arrangement 15 as well as the tape guide 16. At the same time the magnetic tape comes into operative contact with the stationary magnetic heads 27 and 28, which in the usual manner serve for recording, reproducing or erasing additional information in separate longitudinal tracks on the magnetic tape.

In the present embodiment a helical wrap of approximately 180° around the tape guide 16 and the magnetic-head arrangement 15 is used. In accordance with these system parameters the magnetic-head arrangement 15 comprises two magnetic heads 29 and 30, which rotate at a given level and which are spaced approximately 180° from each other, so that during one revolution of the magnetic-head arrangement in a given direction of rotation, indicated by the arrow 31, each of the two magnetic heads scans a track which extends obliquely of the magnetic tape. In order to obtain such a helical wrap the tape guide 16 and the magnetic-head arrangement 15 are mounted on the chassis 1 at a specific angle of inclination α, sloping away from the cassette (FIG. 7). Thus the magnetic tape extends from the guide pin 22 parallel to the chassis 1 to the tape guide 16 and the magnetic-head arrangement 15, and leaves said arrangement in the direction of the guide pin 23, inclined at an angle 2α towards the chassis 1. In order to return the magnetic tape to the level of the cassette, the tape guide device 18 is also inclined at the angle 90°−2α in its operating position, for example by a corresponding geometry of the guideway 20, so that the magnetic tape which leaves the guide pin 24 rises towards the cassette at the angle 2α. By means of a further correspondingly inclined and oriented guide pin 32, the magnetic tape is guided so that it again extends parallel to the chassis 1, after which it can enter the cassette to the guide roller 6. The angle of inclination α of the tape guide 16 and the magnetic-head arrangement 15 is selected so that the magnetci heads 29 and 30, as is shown in FIG. 3, successively scan oblique tracks 34, 35, et. which each extend within a longitudinal half 33 of the magnetic tape 3. The individual tracks may extend from the relevant edge of the magnetic tape to the middle of the magnetic tape or from the middle to the edge, depending on the arrangement of the magnetic heads relative to the magnetic tape. At the edge and the middle of the magnetic tape comparatively narrow zones can then remain free, in which zones longitudinal tracks can be accommodated which are scanned by means of the magnetic heads 27 and 28 respectively. Obviously a different type of wrap around the tape guide 16 and the magnetic-head arrangement 15 may be selected, such as with a wrapping angle of approximately 360° or with a wrapping angle of less than 180°, in which case the number of magnetic heads required changes accordingly to one or more than two, as is known from the present state of the art.

In such an apparatus means are provided whereby, for scanning the tracks, the magnetic tape can also be driven at the given speed in the opposite direction of movement in comparison with a given direction of movement, for example from the tape roll 4 via the tape guide 16 and the magnetic head arrangement 15 to the tape roll 7, as is indicated in FIG. 1 by the arrow 36, in which the magnetic tape is driven at a given track-scanning speed. In this opposite direction of movement the magnetic tape then extends from the tape roll 7 via the tape guide 16 and the magnetic-head arrangement 15 to the tape roll 4, as is indicated by the arrow 37 in FIG. 1. In the case of the opposite direction of movement 37 of the magnetic tape the magnetic-head arrangement 15, whose direction of rotation 38 is opposite to the given direction of rotation 31, again scans oblique tracks 42, 43 etc. which are situated in the second longitudinal half 41 of the magnetic tape 3, as is apparent from FIG. 3, by means of two magnetic heads 39 and 40 which operate at a further level which is spaced from the given level of the magnetic heads 29 and 30 substantially a distance which is substantially equal to half the width of the magnetic tape. In this way it is ensured that in one direction of movement 36 of the magnetic tape the tracks which are situated within the longitudinal half 33 of the magnetic tape are scanned and in the opposite direction of movement 37 of the magnetic tape the tracks which are situated within the second longitudinal half 41 of the magnetic tape are scanned. A change-over from the scanning of the tracks in one longitudinal half to the scanning of the tracks in the other longitudinal half is then possible without a prolonged interruption, because it is merely necessary to reverse the direction of movement of the magnetic tape and to bring into operation magnetic heads which rotate at a corresponding level in a corresponding direction of rotation, which may for example be effected automatically by the apparatus when a specific point or the end of the magnetic tape is reached, or by the user of the apparatus by actuation of an appropriate control.

In order to obtain a reversible direction of movement of the magnetic tape, said tape being moved with a given speed in order to scan the tracks, the present embodiment comprises a drive arrangement 44 for the magnetic tape, which arrangement comprises two drive shafts 47 and 48 which can be driven in opposite directions of rotations and which each cooperate with a pressure roller 45 and 46 respectively, the drive shaft 47 with respect to the predetermined direction of movement 36 of the magnetic tape, and the drive shaft 48 with respect to the opposite direction of movement 37 of the magnetic tape, being located upstream of the tape guide 16 and the magnetic-head arrangement 15. The drive shafts 47 and 48 are mounted on the chassis 1, whilst the associated pressure rollers 45 and 46 are arranged on the adjustable tape guide devices 18 and 17 respectively, so that they can be brought selectively into operative contact with the magnetic tape and the corresponding drive shaft. As is apparent from FIG. 1, the drive shaft 47 cooperates with a length of magnetic tape which is inclined relative to the chassis at an angle 2α, for which reason said drive shaft is so arranged on the chassis that it extends perpendicularly to this length of magnetic tape, and thus parallel to the axes of the guide pins 23, 24 and the pressure roller 45, towards the tape guide device 18. The drive shaft 48, however, cooperates with a length of magnetic tape which extends parallel to the chassis, for which reason it is arranged perpendicularly to the chassis, extending parallel to the axes of the guide pints 21, 22 and the pressure roller 46 towards the tape guide device 17. Of these two drive shafts 47 and 48 only the drive shaft which is located upstream of the tape guide 16 and the magnetic-head arrangement 15 when the magnetic tape is in motion is operative.

FIG. 1 represents the movement of the magnetic tape in the predetermined direction of movement 36, in which the drive shaft 47 is operative. Accordingly the tape guide device 18 has been moved so far in the direction of the arrow 26 that the associated pressure roller 45 is in operative contact with the magnetic tape and presses it against the drive shaft 47. The tape guide device 17 has been moved in the direction of the arrow 25 only to a location near the drive shaft 48, so that its associated pressure roller 46 does not press the tape against operative contact with the drive shaft 48, as a result of which this drive shaft is inoperative for this direction of movement of the magnetic tape. In order to drive the magnetic tape in the opposite direction of movement 37, it is merely necessary to move the tape guide device 18 slightly in the opposite direction to the arrow 26 so that the pressure roller 45 is moved away from the drive shaft 47, and to move the tape guide device 17 slightly further in the direction of the arrow 25 so that its associated pressure roller 46 presses the tape against the drive shaft 48. Obviously it is also possible to bring the two tape guide devices 18 and 17 into an end position relative to the drive shafts 47 and 48 in which neither of the pressure rollers cooperates with the drive shafts and subsequently, depending on the desired direction of movement of the magnetic tape, to apply either the pressure roller 45 to the drive shaft 47 or the pressure roller 46 to the drive shaft 48. Depending on the direction of movement of the magnetic tape it is of course also necessary to drive the winding mandril 13 or 14 in the corresponding direction of rotation, in order to ensure that the tape unwound from one of the two tape rolls 4 or 7 is wound onto the other tape roll.

Such a drive arrangement 44, with two drive shafts 47 and 48 which can be driven in opposite direction of rotation and which are arranged relative to the tape guide 16 and the magnetic-head arrangement 15 as described ensures an exact path of the magnetic tape round the tape guide 16 and the magnetic-head arrangement 15 in both directions of movement 36 and 37 of said tape which is very important for a satisfactory recording or reproduction of the signals. Obviously, such a drive arrangement could be constructed in a different manner; for example it could be so constructed that only one drive shaft is provided with which the magnetic tape, after leaving the tape guide 16 in the magnetic-head arrangement 15 is brought into operative contact by means of one or the other of two pressure rollers, the direction of rotation of the drive shaft being reversed accordingly.

In respect of the construction and operation of the tape guide 16 and the magnetic-head arrangement 15, which are only schematically represented in FIG. 1, several possibilities exist, which will be described in more detail hereinafter by means of some examples.

In the embodiment of FIG. 2 a mounting plate 49 is mounted on the chassis 1, which plate carries the tape guide 16 and the magnetic-head arrangement 15. In this case the tape guide 16 comprises a hollow drum which is secured to the mounting plate 49 and to whose bottom surface 50 a motor 51 is coaxially secured, the drive shaft 52 of which extends through the drum. On this drive shaft 52 a further hollow drum 52 is mounted, an edge 54 of which is separated by a gap 55 from the free edge 56 of the tape guide 16. This drum 53, which can be rotated by the motor 51, serves as support for the magnetic heads of the magnetic-head arrangement 15. In the circumferential surface 57 of the tape guide 16 a helocal step 58 is formed, which starting from the free edge 56 of the tape guide extends through 180° around the tape guide and downwards in the direction of the chassis through substantially half the width of the magnetic tape. The step 58 forms a guide for one edge of the magnetic tape 3, which in this case extends along the re-entrant circumferential surface 59 of the tape guide 16, which surface also acts as a guide. A further guide for the magnetic tape is formed by the circumferential surface 60 of the drum 53 around which surface the magnetic tape also passes through an arc of 180°. FIG. 2 shows how the magnetic tape 3 is thus wrapped around the tape guide 16 and the drum 53. In the given direction of movement 36 of the magnetic tape it runs onto the circumferential surface 60 of the drum 53 over substantially its full width, leaving said drum after travelling along the helical path of approximately 180° still running on the surface 60 of the drum 53 over substantially half its width. In the direction of movement 36 the magnetic tape 3 thus runs onto the re-entrant circumferential surface 59 of the tape guide 16 near the free edge 56 of said guide, guided by the step 58 on said guide, leaving the guide after travelling along the helical path of approximately 180° and then running over substantially half the width of the magnetic tape on the surface 59. The magnetic heads 29 and 30 of the magnetic-head arrangement 15, which heads are operative in the given direction of movement 36 of the magnetic tape, are arranged on the drum 53, in known manner, diametrically opposite each other near the drum edge 54, so that they rotate at a given level and each come into operative contact with the magnetic tape 3 over the wrapping angle of 180°. As stated previously and as shown in FIG. 3 the magnetic heads 29 and 30 scan oblique tracks 34, 35 etc., which are each situated within the longitudinal half 33 of the magnetic tape 3.

In the present embodiment two diametrically opposed radially extending openings 61 and 62 are formed in the drum 53, which openings open out of the circumferential surface 60 of said drum and are spaced from the drum edge 54 by a distance substantially equal to half the width of the magnetic tape. In these openings 61 and 62 further magnetic heads 39 and 40 respectively of the magnetic-head arrangement 15 are disposed, so that said heads rotate at a further level, which is spaced from the given level at which the magnetic heads 29 and 30 rotate by a distance substantially equal to half the width of the magnetic tape. The magnetic heads 39 and 40 then also cooperate with the magnetic tape, because at the further level this tape is also wrapped around the drum 53 through 180°. When the drum 53 is driven with a direction of rotation 38 opposite to the given direction of rotation 31 by changing the polarity of the motor 51, the magnetic heads 39 and 40 will scan oblique tracks 42, 43 etc. which are each situated within the second longitudinal half 41 of the magnetic tape 3, when the magnetic tape is moved in a direction of movement 37 opposite to the given direction of movement 36, as will be apparent from FIG. 3.

In the present embodiment all the four magnetic heads 29, 30, 39 and 40 of the magnetic-head arrangement 15 are always in operative contact with the magnetic tape 3. Therefore, means are provided whereby, depending on the direction of rotation of the drum 53, only those two magnetic heads 29, 30 or 39, 40 are electrically activated which are disposed at the level corresponding to that longitudinal half of the magnetic tape whose tracks are to be scanned for the relevant direction of rotation of the drum 53 and the corresponding direction of movement of the magnetic tape. For the direction of rotation 31 of the drum 53 the magnetic heads 29 and 30 and for the direction of rotation 38 of the drum 53 the magnetic heads 39 and 40 are electrically activated in that during a recording signals are supplied to them or during reproduction signals induced in them are taken off. For the supply or take-off of the signals to or from the magnetic heads there is provided a rotary transformer, whose stationary section 63 is secured to the tape guide 16 and whose rotary section 64 is secured to the drum 53. These transformer sections each comprise four annular coils which are disposed opposite the coils of the other section and are thus electrically coupled to them, the annular coils of the rotary transformer section 64, in a manner not shown, each being connected to one of the four magnetic heads and the annular coils of the stationary transformer section 63 being connected to the electrical circuitry of the apparatus.

In the embodiment of FIG. 4 a drum 53 is again provided as a support for four magnetic heads 29, 30, 39 and 40, the magnetic heads 29 and 30 again rotating at the given level and the magnetic heads 39 and 40 at a further level, which is spaced from the given level by a distance substantially equal to half the width of the magnetic tape. The magnetic heads 29 and 30 are then again arranged near the edge 54 of the drum 53. However, in the present embodiment the drum 53 has a height which substantially corresponds to only half the width of the magnetic tape. This enables the magnetic heads 39 and 40 to be arranged near a second edge 65 of said drum which is disposed on the opposite side of the drum to the edge 54. In this way the drum 53 itself is simpler to manufacture.

Again a tape guide 16 in the form of a drum cooperates with said drum 53, to which tape guide the motor 51 is secured on whose shaft 52 the drum 53 is mounted. Further this tape guide 16 is fully similar to that of the embodiment of FIG. 2. The magnetic heads 29 and 30 are again disposed in a gap 55 which is formed between the edge 54 of the drum 53 and the free edge 56 of the tape guide 16. Since in the present embodiment, as can be seen, the drum 53 which carries the magnetic heads and only has a height corresponding to approximately half the width of the magnetic tape cannot support and guide the magnetic tape 3 over the full width thereof with its circumferential surface 60, a further drum 66 is provided as an additional tape guide. This drum 66 is coaxial with the tape guide 16 and the drum 53, and is arranged opposite the edge 65 of said drum and rigidly connected to the tape guide 16 by means of an L-shaped bracket 67, which embraces the drum 53. Between the edge 65 of the drum 53 and the adjacent edge 68 of the drum 66, a gap 69 is formed which is similar to the gap 55 and in which the magnetic heads 39 and 40 are disposed. The circumferential surface 70 of the drum 66 in the usual manner constitutes a guide surface for the magnetic tape 3, which is wrapped helically around said drum 66 through an arc of 180°, in a similar way to that in which it is wrapped around the tape guide 16. This again ensures an accurate guidance of the magnetic tape around the magnetic-head arrangement.

In the present embodiment each of the magnetic heads 29, 30, 39 and 40 is connected to the drum via an electrically controllable positioning element 71, 72, 73 and 74, which obviously would also be possible in the embodiment of FIG. 2. Such positioning elements serve for guiding the relevant magnetic head along the tracks to be scanned by it. They comprise for example piezoelectric ceramic elements which, as is apparent from FIG. 5, each consist of two discs 75 and 76, between which an electrode 77 extends and which on their outer sides are also each provided with an electrode 78, 79 respectively. The magnetic head is arranged on the free end of such a positioning element. By applying appropriate electrical control signals to the electrodes the positioning elements can be deflected in both directions to a varying extend along an arc and perpendicularly to their major surfaces so that the relevant magnetic head is adjustable transversely of the track to be scanned by said head and can thus be guided exactly along said track. The construction and drive of such positioning elements is for example described in detail in DE-OS No. 27 41 217.

As is apparent from FIG. 5, the outer electrodes 78 and 79 of such a positioning element, as is customary, are electrically interconnected, so that only two electrical connections are required for such a positioning element. As the magnetic heads 29 and 30 in one direction of movement of the magnetic tape and the magnetic heads 39 and 40 in the opposite direction of movement of the magnetic tape each scan adjacent tracks, it is necessary to apply separate control signals to the positioning elements 71, 72 and 73, 74 respectively associated with said heads, which provide a corresponding tracking correction. Thus, in the case of one common earthin connection a total of five connections will be required for four positioning elements. As such connections to the rotary drum 53 should be made via slip rings, the number of such connections is to be minimized. In the present embodiment each time two positioning elements are therefore suitable electrically connected in parallel, which elements are associated with the magnetic heads which in pairs alternately scan the tracks situated within one of the two longitudinal halves of the magnetic tape depending on the direction of rotation of the drum are simultaneously in operative contact with the magnetic tape. The magnetic heads which are inoperative are then also adjusted in a similar way as the magnetic head used for scanning the tracks in one of the two longitudinal halves of the magnetic tape, but this is of no significance because these magnetic heads are out of operation. Therefore, as is apparent from FIG. 5, the positioning elements 71 and 74 and the positioning elements 72 and 73 are connected in parallel, so that in total only three connections are required for the four positioning elements. These three connections are constituted by three concentric contact rings 80, 81 and 82 arranged on the drum 53, which are in contact with wipers 83, 84 and 85 arranged on the tape guide 16. The wiper 84 constitutes the earthing connection, whilst the wiper 83 is connected to a first control signal generator 86 and the wiper 85 to a second control signal generator 87. Depending on the direction of the tracking error, the two control signal generators supply either a positive or a negative control signal and depending on the magnitude of the tracking error they supply a control signal of corresponding amplitude, so that the positioning elements will deflect correspondingly. The two control signal generators 86 and 87 are controlled by a circuit arrangement 88, which supplies control signals which are proportional to the corresponding tracking error signals, which are applied to the input 89 of the circuit arrangement 88, but whose generation is not discussed in more detail because such steps are not essential for the present invention.

A different embodiment for guiding the magnetic heads along the tracks to be scanned by said heads is represented in FIG. 6, which embodiment comprises a drum 53, a tape guide 16 and a further drum 66, as described for the embodiment of FIG. 4. In this case the magnetic heads 29 and 40, which again are in operative contact with the magnetic tape 3 at the same time, are accommodated on a common holder 90, which extends through a slot 91 formed in the drum 53 and which defines the two levels for the magnetic heads 29 and 40. This holder 90 is connected to the drum 53 via a single electrically controllable positioning element 92, so that the two magnetic heads 29 and 40 can be guided along the tracks in conformity with the deflection of this positioning element. In order to ensure that the magnetic heads, as far as possible, are adjusted parallel to their levels, a leaf spring 93 is connected to the holder 90, which spring extends parallel to the positioning element 92 and is connected to the drum 53. In this way the positioning element 92 and the leaf spring 93 together constitute a parallel guidance for the holder 90. By the use of a single positioning element such a construction is simple and economical. Obviously, such steps may also be employed in an embodiment in accordance with FIG. 2.

In the embodiments of FIGS. 2, 4 and 6 described in the foregoing, the magnetic heads are arranged in two pairs which are positioned for rotation one pair at each of the two levels and which pairs are selectively cooperable with the magnetic tape during a revolution of the drum. In this respect it was stated that depending on the direction of movement of the magnetic tape only those magnetic heads are electrically activated which rotate at such a level that they scan tracks in the longitudinal half of their magnetic tape corresponding to this direction of movement of the magnetic tape. Such an electrical activation of the magnetic heads for the active scanning of the tracks is then effected depending on the instantaneous direction of movement of the magnetic tape and/or the direction of rotation of the drum. Hereinafter embodiments are described using a mechanical activation of the magnetic heads for the active scanning of the tracks situated in the relevant longitudinal half of the magnetic tape. Such a mechanical activation of the magnetic heads can be achieved by a corresponding mechanical adjustment of said heads relative to the circumferential surface of the drum. The required displacement may for example be obtained by means of a lifting magnet arranged on the drum, which in its turn is electrically controlled via slip rings on the drum. A further possibility is to transmit the required movement from the apparatus to the rotary drum. Such an embodiment is shown in FIG. 7, which employs a construction for the drum 53 and the tape guide 16 similar to that employed in the embodiment of FIG. 2, through this is by no means essential. The actual constructional steps for adjusting the magnetic heads are not shown in FIG. 7; for the sake of clarity this is shown on an enlarged scale in separate Figures, each of which represents the part of the construction surrounded by broken lines and designated 94 in FIG. 7.

As is apparent from FIG. 7, an arm 95, on which a lever 96 is pivotably journalled and which extends parallel to the shaft 52 of the motor 51, is secured to the mounting plate 49. One end 97 of this lever is articulated to a connecting rod 98, which by means of movable parts of the apparatus or by means of a lifting magnet is caused to perform a movement which is related to the instantaneous direction of movement of the magnetic tape and/or direction of rotation of the drum and which is transmitted to the layer 96. The other free end 99 of the lever 96, which end is preferably spherical, engages in an annular slot 100 formed in a control sleeve 101 which is adapted to slide along the shaft 52 to which the hollow drum 53 is secured. The control sleeve 101 is coupled to the drum 53 so as to rotate with said drum, for which purpose two diametrically opposed, axially extending projections 102 and 103 on said sleeve each engage in a corresponding one of two slots 104 and 105 which are formed in the drum 53 and which extend radially thereof and are located diametrically opposite each other. In this way the control sleeve 101 rotates together with the drum 53 but is axially movable by means of the lever 96, thus enabling the movement of the connecting rod 98 to be transmitted inside the drum 53. The projections 102 and 103 are provided with for example, trunnions 106, 107 or journals or the like at their ends, by which the control movement can be imparted to the diametrically opposed magnetic heads on the drum.

The section 94 of FIG. 7 shows in FIG. 8 comprises an adjusting device 108 for the mechanical activation of the magnetic heads 29 and 40, during which activation said heads perform a pivotal movement relative to the circumferential surface 60 of the drum 53. This pivotal movement takes place in a radial plane, so that the magnetic heads are lifted off the magnetic tape and are not readjusted while in contact with said tape, so that damage to both the highly vulnerable magnetic heads and to the equally vulnerable magnetic tape is prevented. In the present embodiment a toggle 109 is provided for adjusting the magnetic heads, which toggle is pivotably journalled in the slot 105 in the drum 53. For this purpose the toggle 109 comprises trunnions 110 which engage in V-shaped bearing recesses 111 which are formed in the sides of the slot 105 of the drum 53. The magnetic heads 29 and 40 are respectively arranged on the outer sides 112 and 113 of the toggle, which sides taper towards each other. Parallel to said outer sides are two set screws 114 and 115 which are provided on the toggle and the free ends of which are adapted to cooperate with stop surfaces 116 and 117 on the drum, thus enabling the end positions of the magnetic heads relative to the circumferential surface 60 of the drum to be adjusted. In a recess 118 in the toggle a spindle 119 is arranged, which serves as point of engagement for a lever arrangement belonging to an over-centre adjusting device 108. This lever arrangement comprises a lever 121 which is pivotable about a spindle 120 in the slot 105, which lever has a fork-shaped end 122 with which it engages with the trunnion 107 on the projection 103 of the control sleeve 101. An arm 124 is pivotably journalled on the other end 123 of the lever 121, the free, fork-shaped end of said arm engaging with the spindle 119 on the toggle 109. On this arm 124 is mounted a helical spring 125 which bears at one end against a collar 126 formed on the arm 124 and at the other end against the spindle 119.

FIG. 8 shows the adjusting device 108 with the toggle 109 in a position in which the magnetic head 29 has been mechanically activated for track-scanning and is disposed adjacent the circumferential surface 60 of the drum 53, whereas the magnetic head 40 has been mechanically deactivated and has been withdrawn from the circumferential surface 60 of the drum 53. As can be seen, this position of the toggle 109, which is fixed by means of the set screw 114 and determined by the spring 125 constitutes an over-centre position of the toggle because the force of the spring 125 acts between the stop surface 116 and the V-shaped bearing recess 111 on the one hand and the spindle 120 on which the lever 121 is journalled on the other hand. Thus the active position of the magnetic head 29 is solely determined by the over-center position of the toggle and is thus defined exactly and without lost motion. Moreover, a decoupling from the control sleeve 101 in respect of force is obtained, so that the movement to be transmitted by said sleeve is not critical and any tolerances in this respect may be ignored.

For mechanically activating the magnetic head 40 starting from this position of the adjusting device 108, the control sleeve 101 is moved in the direction of the arrow 127, so that the lever 121 and thus the arm 124 is pivoted until finally under the influence of the spring 125 the toggle 109 is tilted into its other over-center position, in which the set screw 115 defines the position of the magnetic head 40 relative to the circumferential surface 60 of the drum 53 and in which the magnetic head 29 is then withdrawn from said surface 60. In order to adjust the magnetic heads 30 and 39 there is provided a similar adjusting device, which is activated by the trunnion 106 on the projection 102 of the control sleeve 101.

In the embodiment of FIG. 9 the adjusting device 108 comprises two four-bar linkages 129 and 129 which are coupled to each other for a joint movement in opposite directions and on each of which there is arranged one of the two magnetic heads 29 or 40. These four-bar linkages each comprise a plate 130 or 131, which carries the relevant magnetic head and constitutes the coupling member of the four-bar linkage, and two levers 132 and 133, which constitute the cranks of the four-bar linkages and which are pivotably journalled in the slot 105 of the drum 53 by means of spindles 134 and 135. These levers and plates are articulated to each other, for which in the present case V-shaped bearing recesses 136, 137 and 138, 139 are formed in the plates, in which recesses cross-pieces 140, 141 and 142, 143 respectively on the free ends of the levers engage. By means of two tension springs 144 and 145, which act between the plates 130 and 131, the plates and levers are urged towards each other, so that an articulated connection without play is obtained between these parts. As the levers 132 and 133 are common to the two four-bar linkages 128 and 129 the coupling provides a joint movement of the two linkages in opposite directions. For transmitting the adjusting movement of the control sleeve 101 to the four-bar linkages an arm 146 is connected to the lever 132, the free, fork-shaped end of said arm engaging with the trunnion 107 on the projection 103 of the control sleeve 101.

In order to define the instantaneous end position of the magnetic heads 29 and 40 relative to the circumferential surface 60 of the drum 53, a screw 147, 148 formed with an eccentric is provided on each of the plates 130 and 131 respectively, which screws cooperate with corresponding stops 149 and 150 respectively, which project from the drum into the slot 105 thereof. By turning these screws the relevant end positions of the magnetic heads are adjusted. In order to define said end positions of the magnetic heads exactly by means of an over-center action, an arm 151 is mounted on the lever 133, which arm cooperates with a leaf spring 152 clamped in the slot 105 of the drum, which spring tends to pivot said arm either clockwise or anti-clockwise.

The mechanical activation of the magnetic head 40 is again effected by moving the control sleeve 101 in the direction of the arrow 127, as a result of which the four-bar linkages 128 and 129 are pivotally displaced anti-clockwise under the influences of the arm 146, the plate 130 being withdrawn from the circumferential surface 60 of the drum 53 and the plate 131 being simultaneously moved towards the circumferential surface until the eccentric on the screw 148 abuts the stop 150. The leaf spring 152 then exerts a tilting force, so that the end position of the magnetic head 40 is also defined by an over-center action.

In the embodiment of FIG. 10 for scanning the tracks a single magnetic-head arrangement comprising a pair of diametrically opposed magnetic heads is rotatable at either of the two levels selectively, alternately at each level corresponding to the tracks situated within one of the two longitudinal halves of the magnetic tape. Since in the embodiments described, each time the apparatus is in operation diametrically opposed magnetic heads successively scan the tracks within a longitudinal half of the magnetic tape, in the embodiment of FIG. 10 the two magnetic heads have to be moved between the two levels, which are again spaced from each other by a distance substantially equal to half the width of the magnetic tape. FIG. 10 therefore shows an adjusting device 153 for moving a magnetic head 154 between the two levels. When the magnetic head is moved from one level to the other, steps must be taken to ensure that in principle the magnetic head is first withdrawn from the circumferential surface 60 of the drum 53 towards the interior of the drum, is then moved in an axial direction and is subsequently returned towards the circumferential surface of the drum, so that neither the magnetic head nor the magnetic tape are damaged. In the present case the adjusting device 153 again comprises a four-bar linkage 155, whose coupling member is constituted by a plate 156 carrying the magnetic head 154. The cranks of the four-bar linkage in this case comprise four arms, arranged two, 157 and 158, at each sideways of the plate 156 and articulated to said plate and to the side walls of the slot 105 in the drum 53. In this way the plate 56 is movable upwards and downwards in an arc between the pivoting arms, inside the slot 105. Furthermore, the adjusting device 153 comprises a bar 159, which is articulated to the arms 157 and 158 and a fork-shaped end of which engages with the trunnion 107 on the projection 103 of the control sleeve 101.

The two end positions of the magnetic head 154 at the two levels can be defined by means of two set screws 160 and 161 near the circumferential surface 60 of the drum 53, which screws cooperate with corresponding stops 162 and 163 on the plate 156. In order to provide a suitable over-center action for defining the two end positions of the magnetic head 154, there is provided a tension spring 164, which acts at the axis of the pivotal connection between the pivoting arm 158 and the side walls of the slot 105 and at the axis of the articulated connection between the bar 159 and the pivoting arm 157. Again the magnetic head 154 is moved from one over-center position at the level shown into another over-centre position at the higher level by moving the control sleeve 101 in the direction of the arrow 127, the four-bar linkage 155 being pivoted along an arc through the bar 159, and the spring 164 holding the linkage in the end position.

As stated previously, it is alternatively possible to provide an electrical activation of the corresponding magnetic heads for the active scanning of the tracks instead of a mechanical activation, or a combination of both. For such an electrical activation of the magnetic heads it is found to be particularly advantageous when this is effected as near the magnetic heads as possible, in order to avoid any disturbing effects. Therefore, for the electrical activation of the magnetic heads there is suitably provided a switching device on the drum, which depending on its switching position, switches on the corresponding magnetic heads and switches off the other heads. As in such a case an additional mechanical activation on the magnetic heads is no longer necessary, it is furthermore found to be advantageous in this respect if the magnetic heads are arranged to be stationary relative to the circumferential surface of the drum in the radial direction, so that a very simple mechanical construction is obtained.

Starting from an embodiment in accordance with FIG. 2, FIG. 11 shows a circuit arrangement for the electrical activation of the magnetic heads and FIG. 12 shows the mechanical construction for the actuation of the switching device. As is apparent from FIG. 11, there are provided two switches 165 and 166, the switch 165 being associated with the magnetic heads 29 and 40 and the switch 166 with the magnetic heads 30 and 39. Depending on the switching position of said switches either the magnetic heads 39 and 40 or the magnetic heads 29 and 30 are short-circuited. This also results in a simple construction of the rotary transformer 167, which for the sake of simplicity is not shown in FIG. 12, because said transformer need only be provided with two annular windings in the stationary section and in the rotary section, because the magnetic heads that need not become operative should be short-circuited directly so that no distinction need be made in respect of the signal supply.

The actuation of the switches 165 and 166 which as can be seen in FIG. 12, are arranged directly on the drum 53, can be effected by the apparatus in a simple and reliable manner. For this purpose an arm 168 is secured to the mounting plate 49, and on the free end of the arm a lever 169 is pivotably journalled. One end 170 of this lever is fork-shaped, the fork engaging with a trunnion 172 arranged on control rod 171, so that the movement of the control rod is transmitted to the lever. On the shaft 52 of the motor 51, on which shaft the drum 53 is also mounted, a sleeve 173 is arranged so as to be movable against the action of a spring 174. A projection 175 on the sleeve 173 engages in a corresponding recess 176 in the drum 53, so that the sleeve is coupled to the drum so as to rotate together with said drum. A shoulder 177 formed on the sleeve 173 is disposed opposite the movable switching members 178 and 179 of the switches 165 and 166, so that these members can be actuated by the shoulder. A conical raised portion 180, which is coaxial with the drive shaft 52 is formed on the sleeve 173 with which portion the free end 181 of the lever 169 engages. In this way the sleeve 173 can be moved against the action of the spring 174 by the lever 169 with only slight friction, thus actuating the switches 165 and 166 accordingly.

Another suitable actuation of the switching device is obtained if the switches 165 and 166 are actuated automatically in accordance with the direction of rotation of the drum 53. There are various ways of effecting this. A first embodiment is described with reference to FIGS. 13 and 14. In this case the two switches 165 and 166 are arranged diametrically opposite one another on the drum 53, their movable switching members 178 and 179 extending tangentially of a circle concentric with the drum and in opposite directions. On the free end of the shaft 52 on which the drum 53 is mounted a switch-actuating member 182 is arranged in a freely rotatable manner, which member comprises a hub 83 from which two diametrically opposed radial arms 184 and 185 project. Between the two switches 165 and 166 a pin 186 is provided on the drum in a position such that when the drum rotates in the direction of rotation 31 the pin 186 cooperates with the arm 185 to drive the switch-actuating member 182. To an arm 187, which is also connected to the mounting plate 49, a leaf spring 188 is secured which extends towards the free end of the shaft 52 and which on its end facing the shaft 52 is provided with an annular friction coating 189, which cooperates with the hub 183 of the switch-actuating members 182, so that the leaf spring 188 together with the friction coating 189 constitute a brake 190 on the apparatus side, which exerts a braking force on the member 182. When the drum 53 starts to rotate in the direction of rotation 31, the switch-actuating member 182 is retained by the brake 190 until the pin 186 reaches the arm 185 of the member 182, after which the member 182 is moved by the pin 186 and rotates in the direction of rotation 31 with the drum 53. As can be seen, the switches 165 and 166 are then not actuated.

When the drum starts to rotate in the direction of rotation 38, which is opposite to the direction of rotation 31, the switch-actuating member 182 is again initially retained by the brake 190, the pin 186 moving away from the arm 185 of the member 182. As the drum rotates further the switching members 178 and 179 of the two switches 165 and 166 will cooperate with the arms 185 and 184 respectively, tending to rotate the member 182. Under the influence of the reaction force to the braking force of the brake 190 the switching members 178 and 179 are not actuated and subsequently the member 182 is again driven by the drum, so that it rotates with said drum. In this direction of rotation 38 of the drum the two switches 165 and 166 are consequently actuated, thus performing the desired switching operation.

It would also be possible to actuate the switches of a switching device in accordance with the direction of rotation of the drum in such a way that always only one of the switches is actuated. For this purpose the pin 186 would have to be replaced by one of the two switches which are correspondingly arranged on the drum.

Another embodiment for the automatic actuation of the switching device in accordance with the direction of rotation of the drum makes use of the acceleration and centrifugal forces obtaining. As is shown in FIG. 15, a pendulum-shaped lever 191 is provided for this purpose, which lever is pivotable on the drum 53 in a plane perpendicular to the drum axis 52 and about an eccentric axis 192 which is parallel to said drum axis. Starting from the rest position of the lever 191, which is represented by solid lines in FIG. 50 and which when the drum is stationary is defined by means of, for example, a spring 193 or a latch with a comparatively small force, the lever 191, when the drum 53 begins to rotate, for example in the direction of rotation 38, is moved in the direction of the arrow 194 under the influence of the reaction forces as a result of the acceleration of the drum, so that the lever assumes the position represented by dotted lines in FIG. 15. This position is defined by a stop 195 on the drum, the lever 191 being kept in engagement with said stop under the influence of the centrifugal force acting on it. If the drum 53 is braked, the lever 191 is lifted off the stop 195 and moves towards its rest position. If the drum 53 begins to rotate in the opposite direction of rotation, the lever 191 is moved in a direction opposite to the arrow 194 in a similar manner, this position of the lever being defined by a further stop 196 on the drum.

By means of the lever 191 switches of a switching device can be actuated which are arranged on the drum in the two paths of movement of said lever on opposite sides of its rest position. In the present embodiment two magnetically actuated switches 197, 198 and 199, 200 are arranged on the drum in each of the two paths of movement of the lever 191, which switches are actuated by two permanent magnets 201 and 202 respectively mounted on the lever 191.

In the foregoing several examples of magnetic-head arrangements have been described whose direction of rotation is reversible depending on the direction of movement of the magnetic tape. With reference to FIG.

16 an embodiment is now described in which there are provided two groups of magnetic heads which continually rotate in opposite directions of rotation at the two levels, so that a reversal of the direction of rotation of the magnetic-head arrangement is not necessary.

On the chassis 1 there is again mounted a mounting plate 49, which supports a tape guide 16 in the form of a drum and to which is secuted the motor 51, on whose shaft 52 a disc 203 is mounted as a support for the magnetic heads 29 and 30. In this way the magnetic heads 29 and 30 again rotate at a given level near the edge 56 of the tape guide 16 in a gap 55 formed between the disc 203 and the tape guide 16.

Furthermore an L-shaped support 204 is connected to the mounting plate 49. On the limb 205 of the support 204 a further drum-shaped tape guide 206 is mounted, which guide is coaxial with the tape guide 16 and the shaft 52 and an edge 207 of which forms a gap 208 with the disc 203, in which gap the magnetic heads 29 and 30 rotate. The circumferential surface of the further tape guide 206 now serves as a guide surface for the magnetic tape 3, in a similar manner to the circumferential surface 59 of the tape guide 16. Connected to the limb 210 of the support 204 is a further drum-shaped tape guide 211, whose edge 212 faces the tape guide 206 and which is also coaxial with said tape guide 206. A further motor 213 is secured to the tape guide 211. On the shaft 204 of the motor 213, which shaft is coaxial with the shaft 52, a further disc 215 is mounted, which disc carries the magnetic heads 39 and 40. Between the disc 215 and the second edge 216 of the tape guide 206 a gap 217 is formed and between said disc 215 and the edge 212 of the tape guide 211 a gap 218 is formed. The magnetic heads 39 and 40 rotate in said two gaps 217 and 218 at the further level, which is again spaced from the leve at which the magnetic heads 29 and 30 rotate by a distance substantially equal to half the width of the magnetic tape. The circumferential surface 219 of the tape guide 211, in a similar manner to the circumferential surfaces 209 and 59, serves as a guide surface forthe magnetic tape 3, so that circumferential surfaces together constitute a tape guide for the magnetic tape substantially over its full width.

The two discs 203 and 215 are driven in opposite directions of rotation be their associated motors 51 and 213 respectively. Thus, continuously rotating magnetic heads 29, 30 and 39, 40 are available at both levels for scanning the tracks situated within the two longitudinal halves of the magnetic tape. Thus for the active scanning of the tracks within the relevant longitudinal half of the magnetic tape it is merely necessary, depending on the direction of movement of the magnetic tape, to activate the magnetic heads which rotate at the relevant level which again may be effected mechanically and/or electrically.

As is apparent from the foregoing, there are several modifications to the embodiments described, without departing from the scope of the invention. This is particularly so for the embodiment of the magnetic-head arrangement, by means of which, depending on the direction of movement of the magnetic tape, the tracks within the relevant longitudinal half of said tape are scanned with opposite directions of rotation of the magnetic heads.

What is claimed is:

1. A recording and/or-reproducing apparatus comprising at least one magnetic head which is rotatable in a given direction of rotation and at least one drum-shaped taped guide for a magnetic tape, which guide is arranged near said magnetic head, and which magnetic tape can pass around at least a part of the circumferential surface of the tape guide and past the magnetic head which rotates at a given level, the magnetic head scanning oblique tracks situated within one longitudinal half of the magnetic tape, and comprising a drive arrangement for the transport of the magnetic tape in a given direction of movement at a given speed in order to scan the tracks, characterized in that by means of the drive arrangement the magnetic tape can also be driven selectively in a direction of movement opposite to the given direction of movement and at the given speed in order to scan the tracks, and in that during transport of the tape in said opposite direction of movement at least one magnetic head which rotates at a further level which is spaced from the given level by a distance which is equal to substantially half the width of the magnetic tape and which has a direction of rotation which is opposite to the give direction of rotation, scans oblique tracks which are situated within the second longitudinal half of the magnetic tape.

2. An apparatus as claimed in claim 1, characterized in that the drive arrangement comprises two drive shafts which are rotatable in opposite directions of rotation and which each cooperate with a pressure roller, and of which one shaft is located upstream of the tape guide with respect to the give direction of movement of the magnetic tape and the other is located upstream of the tape guide with respect to the opposite direction of movement of the magnetic tape, only that drive shaft being operative which when the magnetic tape is in motion is located upstream of the tape guide.

3. An apparatus as claimed in claim 1 or 2, in which as a support for the rotatable magnetic head there is provided a drum which is rotatable in a given direction of rotation and around at least a part of whose circumferential surface the magnetic tape can pass substantially over its full width, and an edge of which constitutes a gap with an edge of the tape guide, the magnetic head being operative at the given level near said drum edge during transport of the magnetic tape in the given direction of movement, characterized in that during transport of the magnetic tape in said opposite direction of movement the drum can also be driven in a direction of rotation opposite to the given direction of rotation, the magnetic head that scans the tracks situated within the second longitudinal half of the magnetic tape being operative on the drum at the further level which in the direction of the axis of said drum is spaced from said drum edge by a distance which is substantially equal to half the width of the magnetic tape.

4. An apparatus as claimed in claim 3, characterized in that the magnetic head which in the opposite direction of movement of the magnetic tape scans oblique tracks situated within the second longitudinal half of the magnetic tape extends through an opening in the drum, which opening opens out of the circumferential surface of said drum and extends radially of the drum and is situated at the further level.

5. An apparatus as claimed in claim 4, characterized in that on the drum there are provided two magnetic heads which are spaced from each other in the direction of the drum axis by a distance substantially equal to half the width of the magnetic tape and in that the two magnetic heads can be selectively activated electrically and/or mechanically for the active scanning of the tracks situated within one or the other of the two longitudinal halves of the magnetic tape depending on the direction of movement of the magnetic tape and/or the directions of rotation of the drum.

6. An apparatus as claimed in claim 5, characterized in that the two magnetic heads are arranged on a common support, which is connected to the drum through an electrically controllable positioning element for guiding the magnetic heads along the tracks.

7. An apparatus as claimed in claim 5, characterized in that for guiding each of the two magnetic heads along the tracks, each head is connected to the drum through a respective electrically controllable positioning element and that the two positioning elements are electrically connected in parallel.

8. An apparatus as claimed in claim 5, characterized in that the two magnetic heads are arranged to be stationary in a radial direction relative to the circumferential surface of the drum and that for the selective electrical activation of one or the other of the two magnetic heads there is provided on the drum a switching device which, depending on its switching position switches on one of the magnetic heads and switches off the other magnetic head so as to deactivate the latter head.

9. An apparatus as claimed in claim, 8, characterized in that the switching device can be actuated via a sleeve which is coaxial with the drum axis and is axially movable by the apparatus.

10. An apparatus as claimed in claim 8, characterized in that the switching device is adapted to be actuated automatically depending on the direction of rotation of the drum.

11. An apparatus as claimed in claim 10, characterized in that for the automatic actuation of the switching device there is provided a switch-actuating member which is mounted for free rotation about the drum axis and which can be driven by the drum depending on the direction of rotation thereof, and on which a braking force can be exerted by a brake on the apparatus.

12. An apparatus as claimed in claim 10, characterized in that for the automatic actuation of the switching device on the drum there is provided a pendulum-shaped lever which is pivotable in a plane perpendicular to the drum axis and about an eccentric axis which is parallel to the drum axis.

13. A helical scan tape recording and/or reproducing apparatus comprising
- at least one magnetic head which is rotatable at a given level in a first direction of rotation about an axis,
- at least one drum-shaped tape guide for a magnetic tape, disposed coaxial with said axis near said magnetic head, arranged such that a magnetic tape can pass around at least a part of the circumferential surface of the guide and past the magnetic head, the magnetic head scanning oblique tracks situated within one longitudinal half of the magnetic tape, and
- a drive arrangement for transporting the magnetic tape in a first direction of movement at a given speed to permit scanning said tracks,
characterized in that said apparatus further comprises
- means for driving the magnetic tape selectively in a second direction of movement opposite said first direction of movement at said given speed, said driven arrangement and said means comprising two drive shafts which are rotatable in opposite directions of rotation and two pressure rollers, each shaft cooperating with a respective pressure roller, one shaft being located upstream of the tape guide with respect to the first direction of movement of the magnetic tape, and the other shaft being located upstream of the tape guide with respect to the second direction of movement of the magnetic tape; and means for causing operative engagement of the magnetic tape when in motion by only that drive shaft which is upstream of the tape guide,
- means for scanning oblique tracks which are situated within the second longitudinal half of the magnetic tape, while the tape is being driven in said second direction of movement, said means for scanning including a magnetic head rotatable at a further level spaced from the given level by a distance substantially equal to half the width of the magnetic tape, in a second direction of rotation opposite said first direction of rotation about said axis, and
- means for selectively withdrawing said at least one magnetic head from the circumferential surface of the drum toward the interior of the drum.

14. An apparatus as claimed in claim 13 wherein said means for withdrawing includes an over-center adjusting device on the drum, for moving said at least one magnetic head between two over-center positions at said given level and said further level, said device further returning said at least one head toward the circumferential surface of the drum after movement from one level to the other.

15. An apparatus as claimed in claim 13 characterized in that at least two magnetic heads are provided on the drum, axially spaced from each other by a distance substantially equal to half the width of the magnetic tape, said means for withdrawing selectively withdrawing one of said heads and returning the other toward the circumferential surface of the drum.

16. An apparatus as claimed in claim 15, wherein said means for withdrawing comprises an over-center device.

17. An apparatus as claimed in claim 16, characterized in that the two magnetic heads are arranged on a toggle.

18. An apparatus as claimed in claim 16, characterized in that each of the two magnetic heads is arranged on a four-bar linkage and the two four-bar linkages are coupled to each other so as to be movable jointly but in opposite directions.

* * * * *